(12) United States Patent
Clancy et al.

(10) Patent No.: US 8,523,051 B2
(45) Date of Patent: Sep. 3, 2013

(54) REFUSE COLLECTION APPARATUS

(76) Inventors: Terence C. Clancy, Falls Church, VA (US); Elizabeth W. Clancy, Falls Church, VA (US)

( * ) Notice: Subject to any disclaimer, the term of this patent is extended or adjusted under 35 U.S.C. 154(b) by 73 days.

(21) Appl. No.: 13/277,731

(22) Filed: Oct. 20, 2011

(65) Prior Publication Data

US 2013/0098794 A1    Apr. 25, 2013

(51) Int. Cl.
*B65G 11/04*    (2006.01)

(52) U.S. Cl.
USPC ............. 232/44; 220/202; 220/908.3; 193/34

(58) Field of Classification Search
USPC ..... 232/44, 43.1, 43.2, 43.3, 43.5; 193/25 R, 193/25 S, 33, 34; 220/908, 908.1, 908.2, 220/908.3, 913, 202, 360
See application file for complete search history.

(56) References Cited

U.S. PATENT DOCUMENTS

| | | | | |
|---|---|---|---|---|
| 2,792,171 A * | 5/1957 | Rosset | ........................ | 232/43.3 |
| 3,204,740 A | 9/1965 | Legault | | |
| 3,261,441 A * | 7/1966 | Mullens | ........................ | 193/33 |
| 3,554,345 A | 1/1971 | Mullens | | |
| 3,754,501 A * | 8/1973 | Horn | .............................. | 100/99 |
| 4,013,215 A | 3/1977 | Mercier | | |
| 4,704,764 A * | 11/1987 | Metelko, Jr. | ..................... | 15/301 |
| 5,007,581 A | 4/1991 | Douglas | | |
| 5,083,704 A * | 1/1992 | Rounthwaite | ................ | 232/43.2 |
| 5,148,739 A * | 9/1992 | Fox | .................................. | 100/45 |
| 5,257,577 A * | 11/1993 | Clark | ............................... | 100/99 |
| 5,280,688 A * | 1/1994 | Zoccoli | ......................... | 52/173.1 |
| 5,772,112 A | 6/1998 | Bulcroft | | |
| 5,806,759 A * | 9/1998 | Axisa | .............................. | 232/44 |
| 7,422,144 B1 * | 9/2008 | Importico | ........................ | 232/44 |

* cited by examiner

*Primary Examiner* — William L. Miller
(74) *Attorney, Agent, or Firm* — Dale J. Ream

(57) ABSTRACT

A refuse collection apparatus includes a body portion extending between upper and lower ends. The apparatus includes a refuse container having bottom and side walls extending upwardly from the bottom wall and defining an open top and an interior area. A lid is releasably coupled to an upper edge of the side wall and configured to cover the container open top, the chute lower end being fixedly attached to the lid. An exhaust fan is operatively mounted to the lid in communication with the container interior area and configured to withdraw air from the container interior area when actuated. An input station is coupled to the chute upper end and configured to interface with the building wall, the input station having an access door movable between open and closed configurations selectively allowing and preventing access to the chute body portion, respectively.

18 Claims, 4 Drawing Sheets

US 8,523,051 B2

REFUSE COLLECTION APPARATUS

BACKGROUND OF THE INVENTION

The present invention relates generally to waste disposal devices and, more particularly to a refuse collection apparatus for home use. Even more specifically, the present invention relates to an apparatus for transferring diapers from inside a house to a collection container on the outside of the house.

Changing the diapers of an infant can be an unpleasant and unsanitary task. After the changing process, disposing of dirty diapers can be equally unpleasant and inconvenient. For instance, the odor of the soiled diaper often remains for an extended period, especially if the soiled diaper is not sealed in a bag or immediately removed from the room or house. Merely dropping the diaper in a trash receptacle inside the house is unsatisfactory to eliminate the odor and may be unsanitary.

Various devices have been proposed in the art for sealing a diaper in a bag or collecting multiple diapers in a container before transferring them to an outside trash receptacle that may be collected by a garbage collection service. Although assumably effective for their intended purposes, the existing devices do not provide for immediate removal of a soiled diaper from a house, provide for immediate collection of diapers into a waste receptacle outside of the house, and that may be easily emptied by a trash collection service.

Therefore, it would be desirable to have a refuse collection apparatus that includes a chute for transferring refuse, such as a soiled diaper, from inside of a house directly into a refuse container outside of the house. Further, it would be desirable to have a refuse collection apparatus that deodorizes and sanitizes both the input and output ends of the chute. In addition, it would be desirable to have a refuse collection apparatus that indicates to a user when the collection receptacle is full and needs to be emptied by a refuse collection service.

SUMMARY OF THE INVENTION

A refuse collection apparatus for use with a building having an exterior wall includes an upper end and an opposed lower end, the chute including a body portion extending between the upper and lower ends. The apparatus includes a refuse container having a bottom wall and a continuous side wall extending upwardly from the bottom wall, the container side wall defining an open top and an interior area. A lid is releasably coupled to an upper edge of the side wall and configured to cover the container open top, the chute lower end being fixedly attached to the lid. The lid defines an opening positioned in communication with the chute lower end such that refuse passing through the chute is communicated to the container open area. An exhaust fan is operatively mounted to the lid in communication with the container interior area and configured to withdraw air from the container interior area when actuated.

An input station is coupled to the chute upper end and configured to interface with the building wall, the input station having an access door selectively movable between an open configuration providing access to the chute body portion and a closed configuration preventing access to the chute body portion. The input station includes an access door sensor configured to detect when the access door is at the open configuration, the access door sensor being electrically connected to the exhaust fan and configured to actuate the exhaust fan when the sensor detects that the access door is at the open configuration.

Therefore, a general object of this invention is to provide a refuse collection apparatus that enables a user to deliver a soiled diaper from inside a house directly to a collection container outside of the house.

Another object of this invention is to provide a refuse collection apparatus, as aforesaid, having a chute extending from a window of the house to a collection container remote outside of the house.

Still another object of this invention is to provide a refuse collection apparatus, as aforesaid, that automatically activates an exhaust fan when an access door to the chute is opened.

Yet another object of this invention is to provide a refuse collection apparatus, as aforesaid, that visually indicates when the refuse container is full.

A further object of this invention is to provide a refuse collection apparatus, as aforesaid, in which the refuse container may be uncoupled from the chute in order to be collected by a refuse collection service.

A still further object of this invention is to provide a refuse collection apparatus, as aforesaid, that may operate on solar collected energy.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 2c is an isolated view on an enlarged scale taken from FIG. 2a;

FIG. 4a a perspective view of a weight sensing device removed from the refuse container of FIG. 2a;

DESCRIPTION OF THE PREFERRED EMBODIMENT

Figure 1:
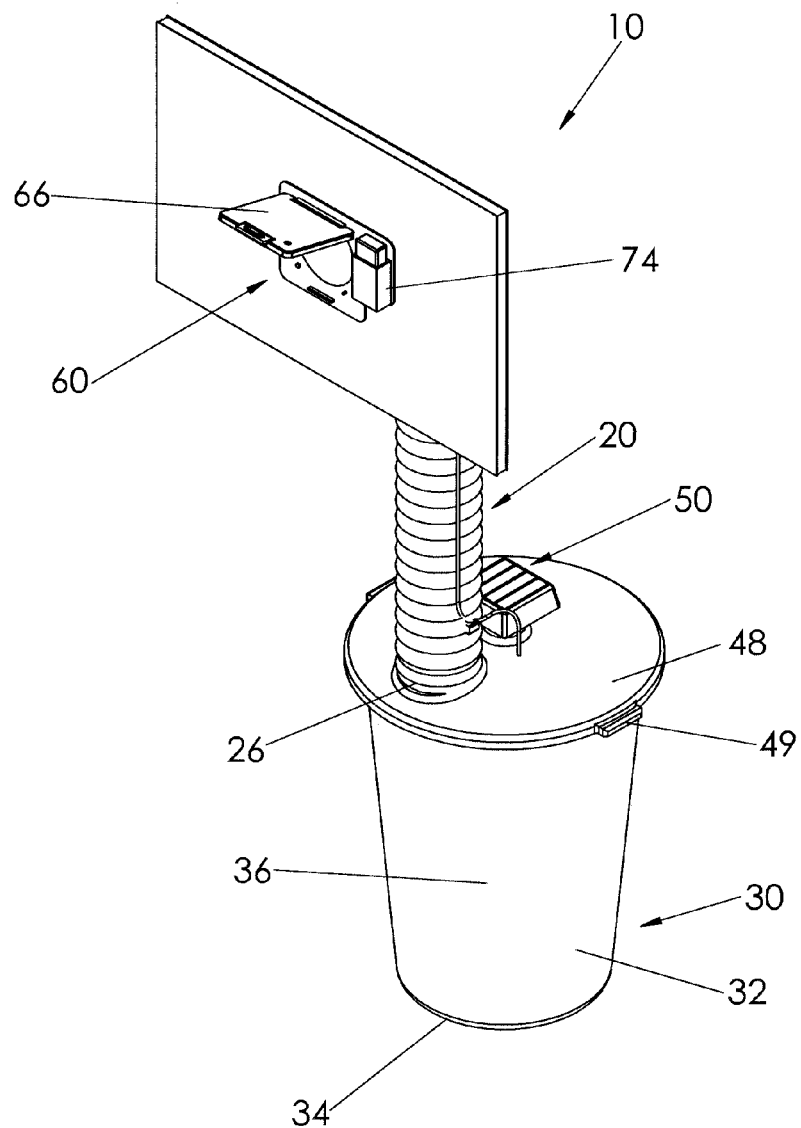
FIG. 1 is a perspective view of a refuse collection apparatus according to a preferred embodiment of the present invention.

A refuse collection apparatus according to the present invention will now be described in detail with reference to FIGS. 1 to 4d of the accompanying drawings. The refuse collection apparatus 10 includes a chute 20, a collection container 30, an exhaust fan module 50, and an input station 60, as will be described more fully below.

The chute 20 in accordance with the present invention includes a body portion 22 that extends between opposed upper 24 and lower 26 ends. Each end defines an opening and the body portion 22 may have a generally flexible tubular configuration such that refuse such as diapers may be inserted into the upper end 24, be transferred by gravity through the body portion 22, and exit from the lower end 26. In this regard, the upper end 24 may also be referred to as an input end or inlet. Likewise, the lower end 26 may be referred to as an output end or outlet.

The refuse container 30 may have a construction substantially similar to other garbage collection containers except as noted below. The refuse container 30 includes a lower portion 32 having a bottom wall 34 and, in an embodiment having a cylindrical configuration, a continuous side wall 36. In an embodiment having a cubical or three dimensional rectangular configuration (also referred to as a rectangular prism or parallelepiped), the side wall may be formed by numerous side walls. An upper edge of the side wall 36 defines an open top. The bottom wall 34 and side wall 36 together define an interior area 38 in which refuse is collected.

The refuse container 30 also includes a lid 48 having a configuration that is complementary to the open top defined by the upper edge of the side wall so as to selectively cover the open top. The lid 48 may be releasably coupled to the container side wall 36 with a latch 49, although other fasteners may be employed. The lid 48 may be fixedly coupled to the lower end 26 of the chute 20 (FIG. 1). The lid 48, then, may define an opening positioned appropriately with attachment of the chute lower end 26 so that refuse deposited in the chute body portion 22 may pass through the chute lower end 26 and lid opening into the interior area 38 of the container 30. Accordingly, the lower portion 32 of the refuse container 30 may be unfastened from the lid 48, leaving the lid 48 attached to the chute lower end 26. This enables a user to move the lower portion 32 to the curb or other location where it may be dumped or otherwise collected by a refuse collection service. It is understood that the refuse collection apparatus 10 may also include an auxiliary lid (not shown) attachable to the lower portion 32 of the container 30 to cover its contents from the environment while the container 30 awaits being processed by a refuse collection service. The lower portion 32 of the container 30 may include wheels (not shown) depending from a bottom of the bottom wall 34 so as to ease movement of the container to a trash pickup area.

The lower portion 32 of the refuse container 30 may also include a weight sensor 40 adjacent the bottom wall 34. The weight sensor 40 may also be referred to as a "fullness sensor" as it is activated when it detects that the container is full and needs to be dumped or collected by a refuse collecting service. Preferably, the weight sensor 40 is electrically connected to a visual indicator 72 on the input station 60 as will be described later so that a user is made aware of the full condition. The weight sensor 40 includes a platform 42 situated in the refuse container adjacent the bottom wall 34. The weight sensor 40 includes a plurality of springs 44 that are spaced apart beneath the platform 42, the springs 44 being configured to be incrementally compressed as weight is applied to the platform 42, such as by an increasing quantity of diapers received into the container 30. At least one pressure sensor 46 is situated under the platform 42, such as adjacent to or at least one of the springs 44, the pressure sensor 46 configured to be actuated when receiving pressure from the platform 42. The springs 44 may be of a type that will provide a predetermined resistance to weight on the platform 42 that is associated with a weight of diapers indicative that the container 30 is full.

The exhaust fan module 50 may be coupled to an upper surface of the lid 48 (FIG. 1). The exhaust fan module 50 is in fluid communication with the interior area 38 of the lower portion 32 when the lid 48 is coupled to the lower portion 32 of the container 30. Specifically, the exhaust fan module 50 includes a fan 52 configured to pull air from inside the lower portion 32 and vent it into the air outside of the container 30 when energized. A charcoal filter (not shown) may be situated adjacent the exhaust fan for collecting impurities before air is vented outside of the exhaust fan module 50. The exhaust fan module 50 may include a solar cell 54 configured to collect solar energy and to convert it to electrical energy. The exhaust fan module 50 may include a rechargeable battery 56 electrically connected to the solar cell 54 and be configured to store converted electricity for use in operating the exhaust fan 52.

Figures 2A, 2B:
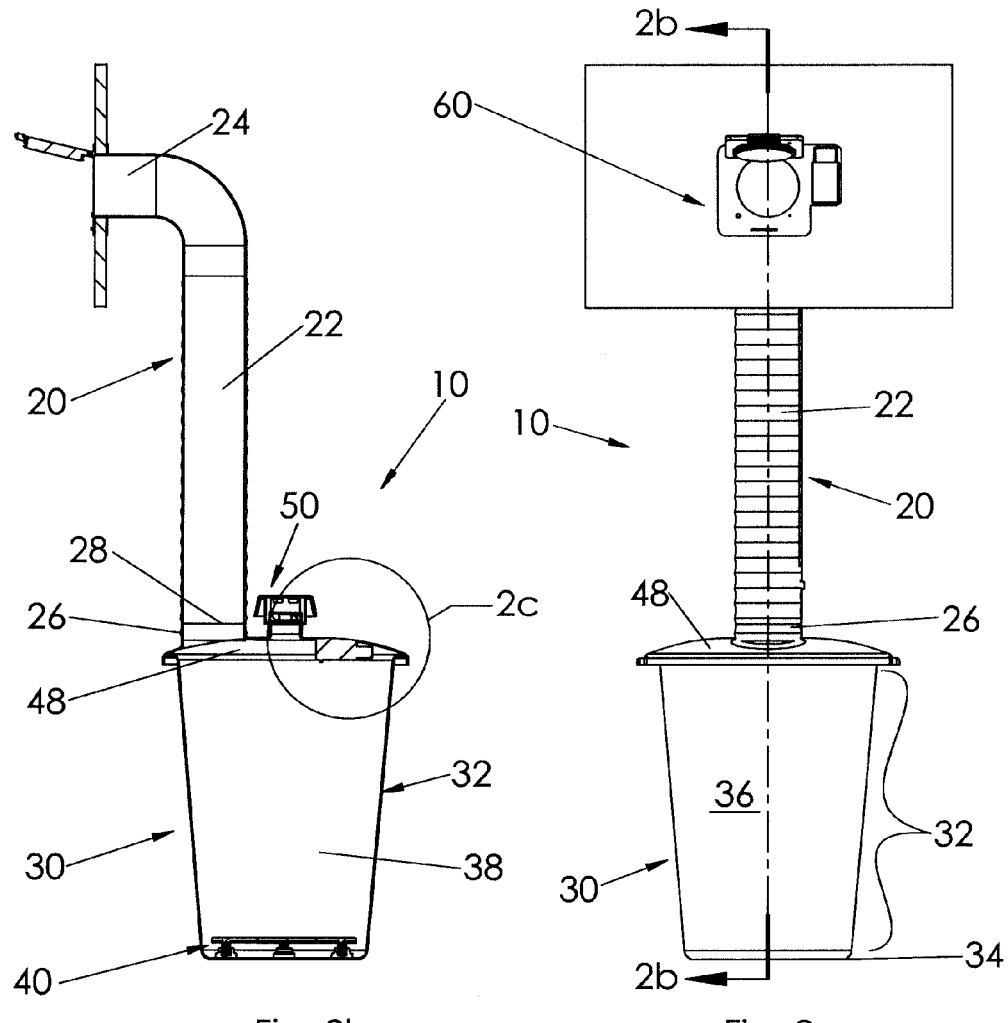
FIG. 2a is a sectional view taken along line 2a-2a of FIG. 2b.
FIG. 2b is a front view of the refuse collection apparatus as in FIG. 1.
Figure 2C:
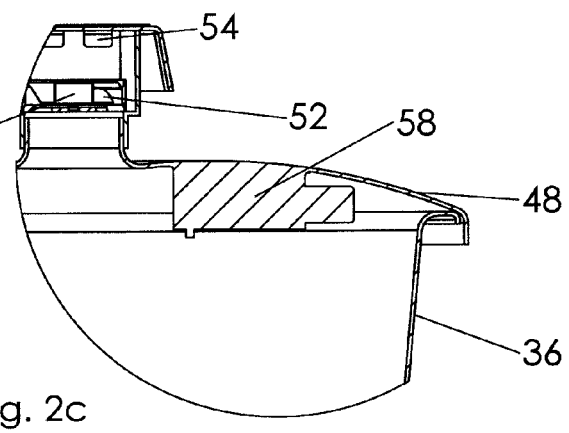

The exhaust fan module 50 is actuated automatically when an access door 66 is moved to an open configuration as will be described later. The exhaust fan module 50 may also include a disinfectant dispenser module 58 coupled to an interior side of the lid 48 (FIG. 2c). The disinfectant dispenser module 58 may be electrically connected to the exhaust fan 52 and configured to dispense an anti-infection or anti-bacterial substance into the interior area 38 of the container lower portion 32 immediately upon deactivation of the exhaust fan 52.

The input station 60 is coupled to the upper end 24 of the chute 20 and configured to interface with a wall or window of a building structure, such as a house (not shown). As particularly shown in FIG. 3, the input station 60 may include one or more flanges 62 that enable the input station 60 to be mounted to a wall or window structure. A forward flange will also be referred to herein as a base plate 64. The flanges/base plate defines an opening that provides access to the upper end 24 of the chute 20. The input station 60 includes an access door 66 that is pivotally coupled to the base plate 64 and movable between an open configuration (FIGS. 1 and 3) providing access to the body portion 22 of the chute 20 and a closed configuration (not shown) preventing access to the chute 20. The access door 66 may include a spring that biases the door toward the closed configuration. In addition, the access door 66 may include a safety latch 68 configured to releasably lock the access door 66 to the base plate 64. The safety latch 68 is intended to provide safety against the door 66 being accessed by young children. Further, the input station 60 may include an access door sensor 70 positioned on the base plate 64 and configured to detect when the access door 66 has been opened. The door sensor 70 may be a pressure activated switch, a motion detector, or the like. The door sensor 70 is electrically connected to the rechargeable battery 56 as a power supply and is also electrically connected to the exhaust fan 52 and configured to activate the exhaust fan 52 immediately when the access door 66 is opened.

The input station 60 may also include a visual indicator 72, such as a light emitting diode (LED) on the base plate 64 that is electrically connected to a weight sensor 40 positioned in the refuse container 30 configured to determine if the container 30 is full, as previously. This weight sensor 40 may also be referred to herein as a "fullness sensor." When the pressure sensor 46 of the weight sensor 40 is activated, a signal is transmitted electrically to the visual indicator 72 so as to illuminate the LED on the base plate 64. It is understood that the "full" signal may be transmitted through wires although a wireless signal emission would also work. The access door sensor 70 and visual indicator 72 are positioned such that they are covered by the access door 66 when the access door 66 is at the closed configuration, although the visual indicator 72 may be seen through an aperture 73 strategically defined by the access door 66 (FIG. 3).

Figure 3:
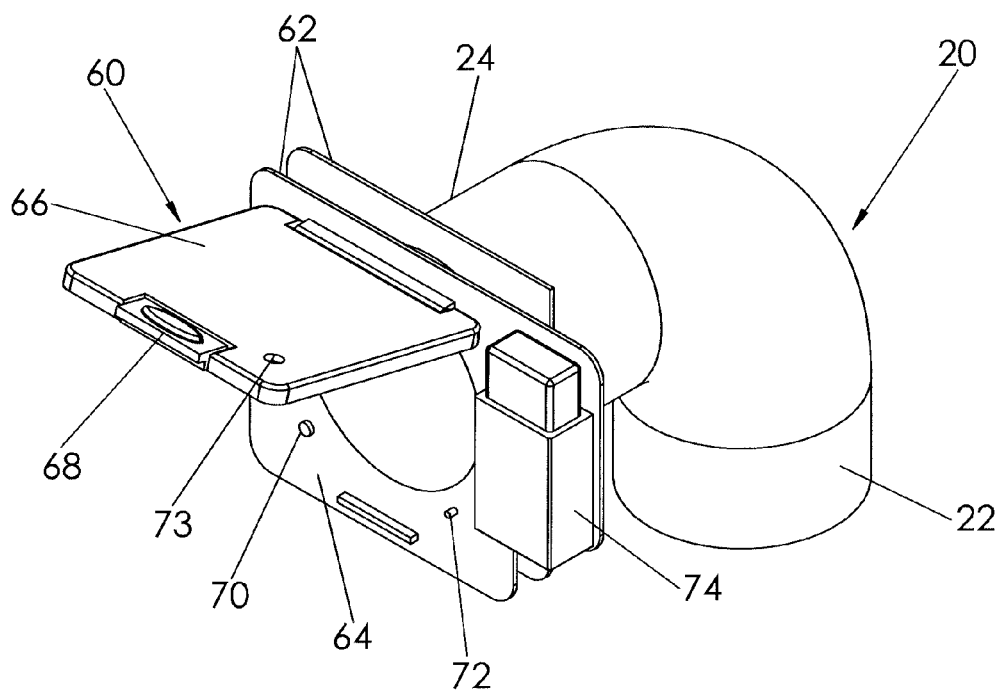
FIG. 3 is an isolated view of an input station removed from the refuse collection apparatus as in FIG. 1.
Figure 4A:
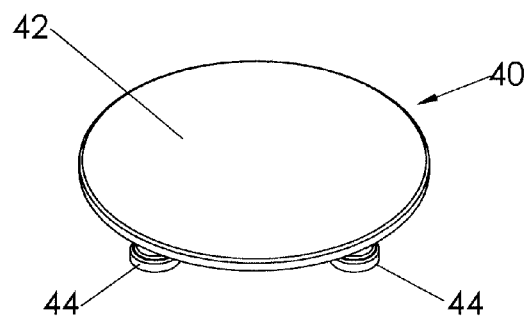
Figure 4B:
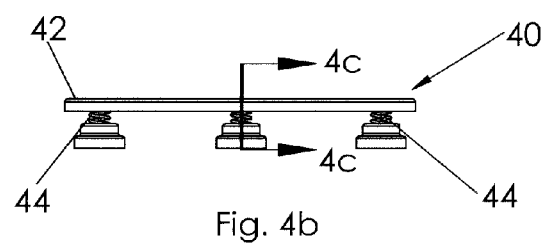
FIG. 4b is a side view of the weight sensing device as in FIG. 4b.
Figure 4C:
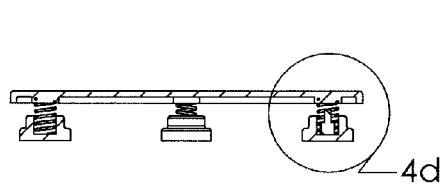
FIG. 4c is a sectional view taken along line 4c-4c of FIG. 4b.
Figure 4D:
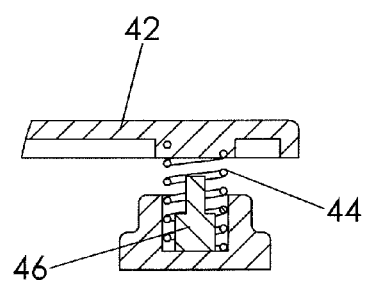
FIG. 4d is an enlarged view on an enlarged scale taken from FIG. 4c.

Further, the input station 60 may include an odor control module 74 mounted to the base plate 64 adjacent the opening to the upper end 24 of the chute (FIG. 3). Preferably, the odor control module 74 includes a removable and replaceable cartridge containing a deodorant substance, a anti-bacterial substance, or both. The odor control module 74 may be configured to direct an output of the deodorizing or anti-bacterial substance into the upper end 24 of the chute 20 when the access door 66 is moved to the open configuration.

In addition, the chute 20 may include a spring loaded flap 28 situated in the body portion 22 adjacent a lower end 26 thereof. The flap 28 is configured to pivot downwardly when a diaper is dropped down the chute 20. The flap 28 allows diapers to pass through and be collected in the refuse container 30, but prevents odor from the container to travel up the chute 20 and escape into the house.

In use, a user may open the access door 66 of the input station 60 and deposit a dirty diaper into the upper end 24 of the chute 20. The diaper will fall through the chute 20 and into the refuse container 30. The fan 52 in the exhaust fan module 50 is automatically actuated when the access door 66 is opened. The fan 52 may be de-energized when the access door 66 is closed again. When the container 30 becomes full or close to full, the weight/fullness sensor 40 will determine if the container is too full and, if so, activates a visual indicator 72 at the input station 60.

It is understood that while certain forms of this invention have been illustrated and described, it is not limited thereto except insofar as such limitations are included in the following claims and allowable functional equivalents thereof.

The invention claimed is:

1. A refuse collection apparatus for use with a building having an exterior wall, comprising:
   a chute having an upper end and an opposed lower end, said chute including a body portion extending between said upper and lower ends;
   a refuse container having a bottom wall and a continuous side wall extending upwardly from said bottom wall, said container side wall defining an open top and an interior area;
   a lid releasably coupled to an upper edge of said side wall and configured to cover said container open top, said chute lower end being fixedly attached to said lid;
   wherein said lid defines an opening positioned in communication with said chute lower end such that refuse passing through said chute is communicated to said container open area;
   an exhaust fan operatively mounted to said lid in communication with said container interior area and configured to withdraw air from said container interior area when actuated;
   an input station coupled to said chute upper end and configured to interface with the building wall, said input station having an access door selectively movable between an open configuration providing access to said chute body portion and a closed configuration preventing access to said chute body portion; and
   wherein said input station includes an access door sensor configured to detect when said access door is at said open configuration, said access door sensor being electrically connected to said exhaust fan and configured to actuate said exhaust fan when said sensor detects that said access door is at said open configuration.

2. The refuse collection apparatus as in claim 1, wherein:
   said refuse container includes a fullness sensor situated in said container interior area configured to detect when said container is full of refuse; and
   said input station includes a visual indicator electrically connected to said fullness sensor and configured to be illuminated when said fullness sensor is indicative that said container is full of refuse.

3. The refuse collection apparatus as in claim 2, wherein said access door sensor and said visual indicator are covered by said access door when said access door is at said closed configuration and are exposed when said access door is at said open configuration.

4. The refuse collection apparatus as in claim 2, wherein said exhaust fan includes:
   a solar cell configured to collect solar energy and to convert said solar energy from to electrical current;
   a rechargeable battery electrically connected to said solar cell and configured to store electrical current converted from solar energy collected by said solar cell; and
   wherein said rechargeable battery is electrically connected to said fullness sensor, said visual indicator, said exhaust fan, and said access door sensor.

5. The refuse collection apparatus as in claim 4, wherein said fullness sensor includes:
   a platform situated in said refuse container on said bottom wall of said container;
   a plurality of springs spaced apart from one another adjacent a bottom side of said platform, said springs configured to be compressed by weight upon said platform; and
   at least one pressure sensor situated adjacent at least one of said plurality of springs and configured to be actuated when said springs are compressed a predetermined amount.

6. The refuse collection apparatus as in claim 5, further comprising:
   an odor control module adjacent said input station access door and configured to direct an anti-odor substance into said upper end of said chute when said access door is moved to said open configuration; and
   a disinfectant spray module positioned in said refuse container and electrically connected to said exhaust fan, said disinfectant spray module being configured to dispense an anti-infection substance into said container interior area when said exhaust fan is deactivated.

7. The refuse collection apparatus as in claim 6, wherein said access door includes a spring configured to bias said access door toward said closed configuration, said exhaust fan being deactivated when said access door is at said closed configuration.

8. The refuse collection apparatus as in claim 1, wherein said chute is constructed of a flexible material.

9. The refuse collection apparatus as in claim 1, wherein said access door includes a spring configured to bias said access door toward said closed configuration, said exhaust fan being deactivated when said access door is at said closed configuration.

10. The refuse collection apparatus as in claim 1, wherein said refuse container is removably coupled to said lid such that said container is removable therefrom and collectable by trash collection personnel.

11. The refuse collection apparatus as in claim 1, further comprising a spring-loaded flap positioned in said chute body portion adjacent said chute lower end, said flap configured to prevent air from said refuse container from flowing upwardly into said chute.

12. The refuse collection apparatus as in claim 1, further comprising an odor control module adjacent said input station access door and configured to direct an anti-odor substance into said upper end of said chute when said access door is moved to said open configuration.

13. The refuse collection apparatus as in claim 12, wherein said odor control module includes an anti-bacterial substance.

14. The refuse collection apparatus as in claim 12, wherein said odor control module includes an anti-bacterial substance in combination with said anti-odor substance.

15. The refuse collection apparatus as in claim 12, wherein said odor control module includes a removable anti-odorant cartridge.

16. The refuse collection apparatus as in claim 12, further comprising a disinfectant spray module positioned in said refuse container and electrically connected to said exhaust fan.

17. The refuse collection apparatus as in claim 16, wherein said disinfectant spray module is configured to dispense an anti-infection substance into said container interior area when said exhaust fan is deactivated.

18. The refuse collection apparatus as in claim 1, further comprising a disinfectant spray module positioned in said refuse container and electrically connected to said exhaust fan, said disinfectant spray module being situated adjacent said open top of said refuse container.

\* \* \* \* \*